(12) United States Patent
Deng et al.

(10) Patent No.: US 11,807,166 B2
(45) Date of Patent: Nov. 7, 2023

(54) AIRBAG WITH RELEASABLE SECONDARY CHAMBERS

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/508,183

(22) Filed: Oct. 22, 2021

(65) Prior Publication Data

US 2023/0128759 A1 Apr. 27, 2023

(51) Int. Cl.
| | | |
|---|---|---|
| *B60R 21/2338* | (2011.01) | |
| *B60R 21/207* | (2006.01) | |
| *B60R 21/015* | (2006.01) | |
| *B60R 21/231* | (2011.01) | |
| *B60R 21/233* | (2006.01) | |
| *B60R 21/00* | (2006.01) | |

(52) U.S. Cl.
CPC .... *B60R 21/2338* (2013.01); *B60R 21/01512* (2014.10); *B60R 21/207* (2013.01); *B60R 21/233* (2013.01); *B60R 21/23138* (2013.01); *B60R 2021/0048* (2013.01); *B60R 2021/23107* (2013.01); *B60R 2021/23146* (2013.01); *B60R 2021/23161* (2013.01); *B60R 2021/23388* (2013.01)

(58) Field of Classification Search
CPC .............. B60R 21/2338; B60R 21/207; B60R 21/23138; B60R 21/233; B60R 2021/0048; B60R 2021/23107; B60R 2021/23146; B60R 2021/23161; B60R 2021/23388
See application file for complete search history.

(56) References Cited

U.S. PATENT DOCUMENTS

| | | | |
|---|---|---|---|
| 8,414,018 B2 | 4/2013 | Choi et al. | |
| 10,300,878 B2 | 5/2019 | Park et al. | |
| (Continued) | | | |

FOREIGN PATENT DOCUMENTS

| | | | | |
|---|---|---|---|---|
| CN | 106965766 B | * | 12/2021 | ............. B60R 21/16 |

*Primary Examiner* — Karen Beck
(74) *Attorney, Agent, or Firm* — Frank A. MacKenzie; Bejin Bieneman PLC (57) ABSTRACT

An assembly includes a first seat and a second seat spaced from the first seat. The assembly includes an airbag supported by the first seat. The airbag is inflatable to an inflated position between the seats. The airbag has a main chamber, a pair secondary chambers supported by the main chamber, and a tether releasably connected to the secondary chambers. The secondary chambers are maintained by the tether in an undeployed position relative to the main chamber and the secondary chambers are releasable by the tether to a deployed position in a cross-vehicle direction relative to the main chamber. The assembly includes a computer including a processor and a memory storing instructions executable by the processor to identify that an occupant is seated in the first seat, identify that an occupant is seated in the second seat and release the tether based on the identification of the occupants seated seats.

20 Claims, 9 Drawing Sheets

(56) References Cited

U.S. PATENT DOCUMENTS

| | | | |
|---|---|---|---|
| 10,926,735 B2 | 2/2021 | Deng et al. | |
| 11,110,883 B1* | 9/2021 | Deng | B60R 21/264 |
| 11,433,848 B1* | 9/2022 | Faruque | B60R 21/231 |
| 2017/0088088 A1* | 3/2017 | Marable | B60R 21/2338 |
| 2017/0334386 A1* | 11/2017 | Park | B60R 21/2338 |
| 2017/0334390 A1* | 11/2017 | Song | B60R 21/23138 |
| 2019/0241148 A1* | 8/2019 | Shin | B60R 21/232 |
| 2019/0263347 A1* | 8/2019 | Choi | B60R 21/2338 |
| 2019/0375363 A1* | 12/2019 | Abe | B60R 21/233 |
| 2020/0122675 A1* | 4/2020 | Perez | B60R 21/203 |
| 2020/0317155 A1* | 10/2020 | Deng | B60R 21/23138 |
| 2021/0009072 A1* | 1/2021 | Hwangbo | B60R 21/01512 |
| 2021/0094499 A1 | 4/2021 | Deng et al. | |
| 2021/0101552 A1 | 4/2021 | Kim | |
| 2021/0188208 A1* | 6/2021 | Kobayashi | B60R 21/233 |
| 2021/0197748 A1* | 7/2021 | Jeong | B60R 21/2338 |

\* cited by examiner

AIRBAG WITH RELEASABLE SECONDARY CHAMBERS

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

Some seat-mounted airbags are mounted to a seatback and are inflatable along a side of an occupant, specifically along the torso and/or hip of the occupant. The seat-mounted airbag, for example, may be inflatable between the occupants of the vehicle. The seat-mounted airbag controls the kinematics of the occupant in vehicle impacts that urge the occupant in a cross-vehicle direction, e.g., a side impact.

DETAILED DESCRIPTION

An assembly includes a first seat and a second seat spaced from the first seat. The assembly includes an airbag supported by the first seat. The airbag is inflatable to an inflated position between the first seat and the second seat. The airbag includes a main chamber and a pair secondary chambers supported by the main chamber. The assembly includes a tether releasably connected to the secondary chambers. The secondary chambers are maintained by the tether in an undeployed position relative to the main chamber and the secondary chambers being releasable by the tether to a deployed position in a cross-vehicle direction relative to the main chamber. The assembly includes a computer including a processor and a memory storing instructions executable by the processor to identify that an occupant is seated in the first seat, identify that an occupant is seated in the second seat, and release the tether based on the identification of the occupants seated in the first seat and the second seat.

The tether may be between the main chamber and the secondary chambers.

The secondary chambers may extend from a proximal end to a distal end, the secondary chambers being supported by the main chambers at the proximal ends and the tether extending from the main chamber to the distal ends of the secondary chamber.

The distal ends of the secondary chambers may be adjacent each other in the undeployed position and the distal ends of the secondary chambers are spaced from each other in the deployed position.

The distal ends may be spaced from each other in the deployed position.

Each of the secondary chambers may define a distance between the distal end and the proximal end, the distance being greater in the deployed position than in the undeployed position.

The instructions may include to not release the tether based on identification of the occupant in the first seat and the lack of identification of an occupant in the second seat.

The main chamber may be in fluid communication with the secondary chambers.

One of the secondary chambers may be adjacent the first seat in the inflated position and the other of the secondary chambers is adjacent the second seat in the inflated position.

The main chamber may include a first panel and a second panel facing an opposite direction of the first panel, one of the secondary chambers being supported by the first panel of the main chamber and the other of the secondary chamber being supported by the second panel of the main chamber.

The secondary chambers may be in the deployed position when the tether is released and the secondary chambers are in the undeployed position when the tether is maintained.

The tether may extend interior to the main chamber and the secondary chambers in the undeployed position.

The tether may extend exterior to the main chamber and the secondary chambers in the undeployed position.

The tether may be continuous between the main chamber and each of the secondary chambers in the undeployed position.

The assembly may include a tether release, the tether being releasable by the tether release.

The instructions may include to activate the tether release based on identification of the occupants seated in the first seat and the second seat.

The first seat and the second seat may each define an occupant head area, the secondary chambers being adjacent the occupant head areas of the first seat and the second seat.

The secondary chambers may be vertically elongated from the main chamber in the inflated position.

The main chamber may be vertically elongated in a common direction to the secondary chambers in the inflated position.

The tether may include a main segment at the main chamber and two segments extending from the main segment to the secondary chambers, respectively.

With reference to the Figures, wherein like numerals indicate like parts throughout the several views, an assembly 10 for a vehicle 12 includes a first seat 14 and a second seat 16 spaced from the first seat 14. The assembly 10 includes an airbag 18 supported by the first seat 14. The airbag 18 is inflatable to an inflated position between the first seat 14 and the second seat 16. The airbag 18 has a main chamber 20 and a pair secondary chambers 22 supported by the main chamber 20. The assembly 10 includes a tether 24 releasably connected to the secondary chambers 22. The secondary chambers 22 is maintained by the tether 24 in an undeployed position relative to the main chamber 20 and the secondary chambers 22 is releasable by the tether 24 to a deployed position in a cross-vehicle direction C relative to the main chamber 20. The assembly 10 includes a computer 26 including a processor and a memory storing instructions executable by the processor to identify that an occupant is seated in the first seat 14. The instructions include to identify that an occupant is seated in the second seat 16. The instructions include to release the tether 24 based on the identification of the occupants seated in the first seat 14 and the second seat 16.

In the event of an impact to the vehicle 12, the airbag 18 inflated to the inflated position between the first seat 14 and the second seat 16. The airbag 18 controls the kinematics of an occupant seated in the first seat 14 and, in the event an occupant is seated in the second seat 16, the airbag 18 controls the kinematics of the occupant in the second seat 16. The secondary chambers 22 may be adjacent occupants seated in the first seat 14 and the second seat 16. The tether 24 is released and the secondary chambers 22 may move cross-vehicle from the undeployed position to the deployed position when an occupant is seated in the first seat 14 and an occupant is seated in the second seat 16. In such an example, the secondary chambers 22 in the deployed position control the kinematics of the occupants to reduce the likelihood of contact between the occupants, specifically, the heads of the occupants. The tether 24 maintains the secondary chambers 22 in the undeployed position when an occupant is seated in the first seat 14 and no occupant is seated in the second seat 16. In such an example, the secondary chambers 22 in the undeployed position limit cross-vehicle head movement of the occupant in the first seat 14 in the event of the impact, e.g., during a side impact.

Figure 1:
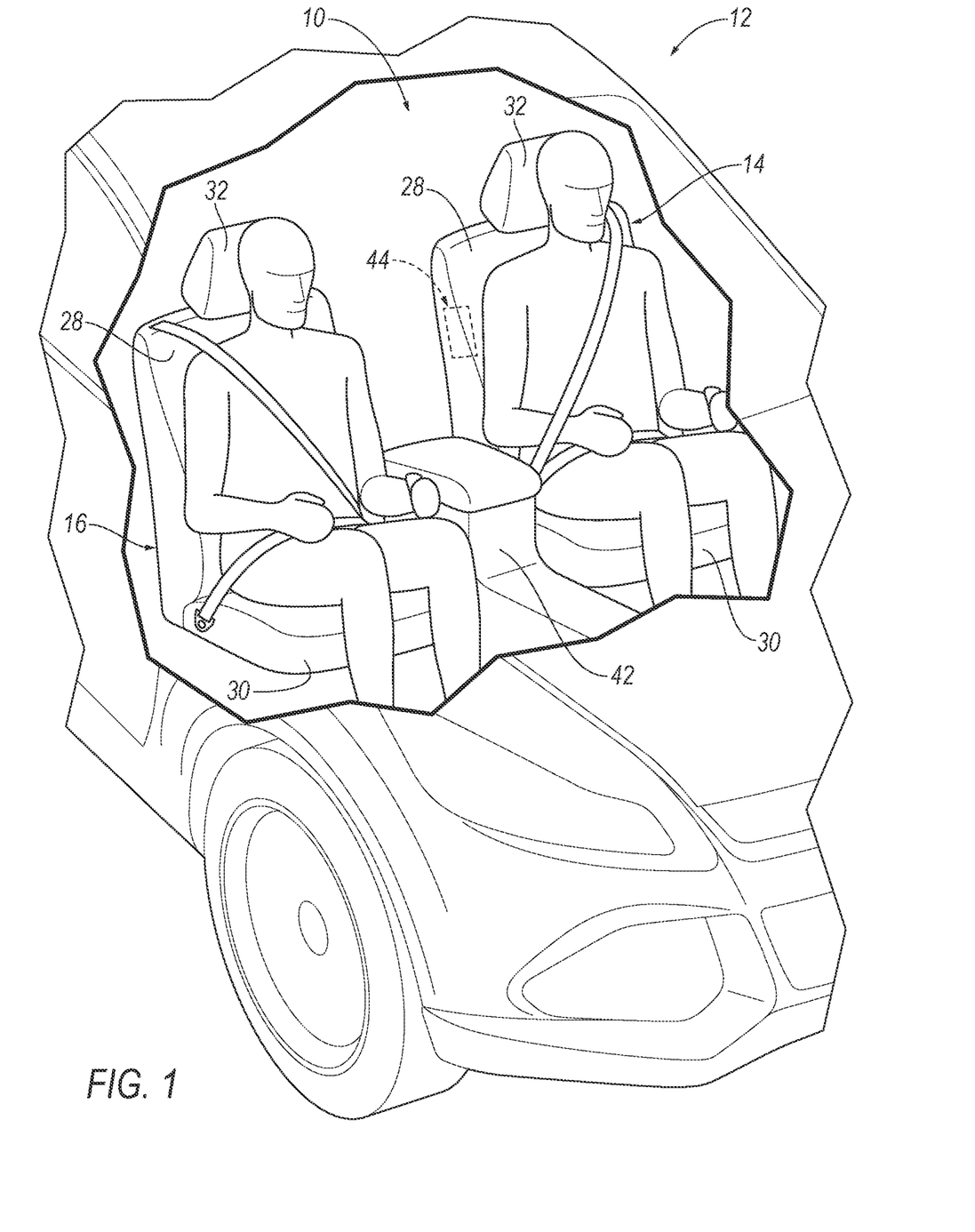
FIG. 1 is a perspective view of a vehicle with a first seat, a second seat, and an airbag supported by the first seat in an uninflated position.
Figure 2:
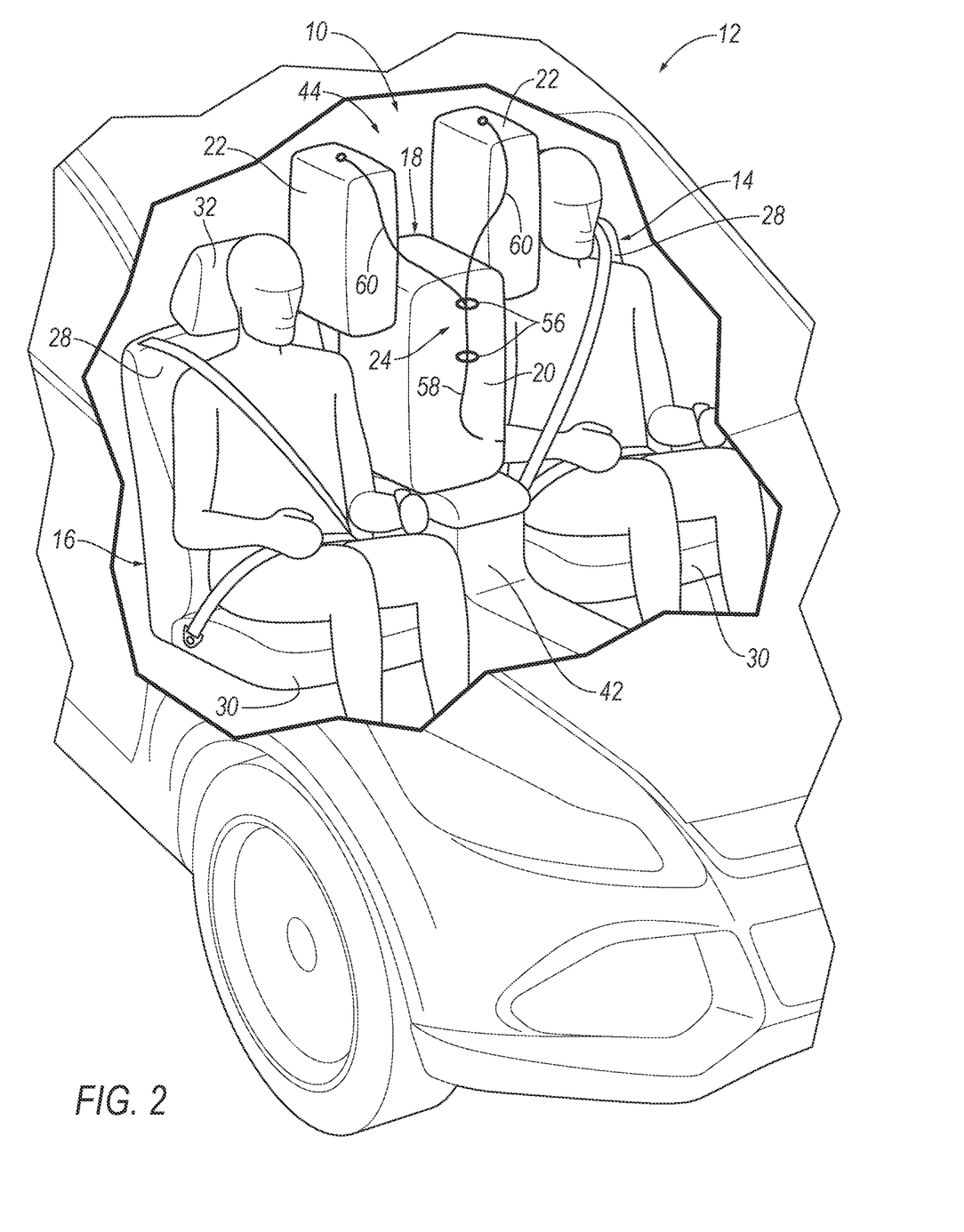
FIG. 2 is a perspective view of the vehicle with the first seat, the second seat, and the airbag in an inflated position between the first seat and the second seat.
Figure 3:
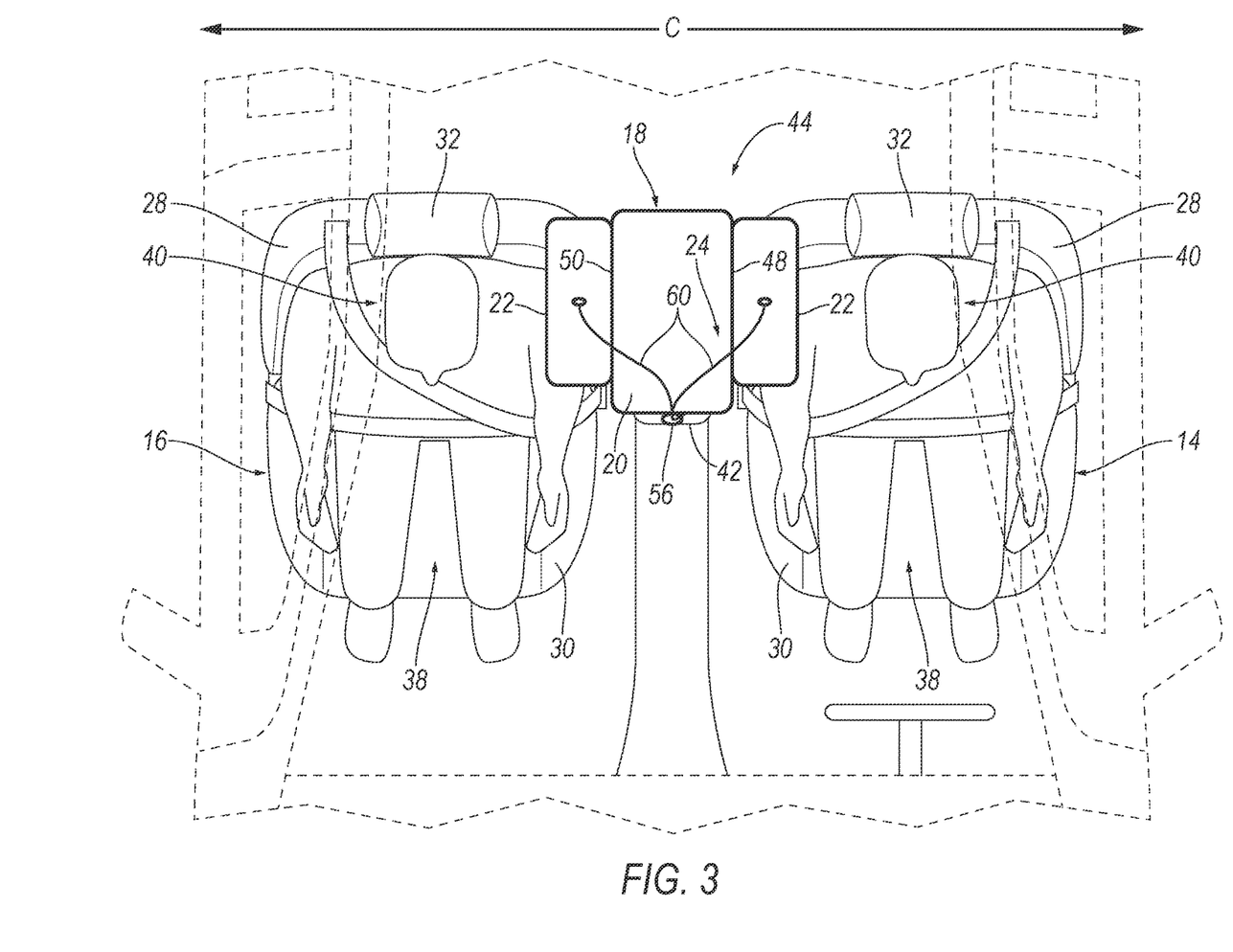
FIG. 3 is a plan view of the vehicle with the first seat, the second seat, and the airbag in the inflated position between the first seat and the second seat.

With reference to FIGS. 1 and 2, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input. The vehicle 12 includes a body (not numbered) including rockers, roof rails, pillars, body panels, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIGS. 1 and 2, the vehicle 12 may include one or more seats 14, 16. The vehicle 12 may include any suitable number of seats 14, 16. The vehicle 12 includes the first seat 14 and the second seat 16 spaced cross-vehicle from each other. The seats 14, 16 are supported by a vehicle floor (not numbered). The seats 14, 16 may be arranged in any suitable arrangement in the passenger compartment. As in the example shown in the Figures, one or more of the seats 14, 16 may be at the front end of the passenger compartment, e.g., a driver seat and/or a passenger seat. In such an example, the first seat 14 may be the driver seat of the vehicle 12 and the second seat 16 may be the passenger seat of the vehicle 12. In other examples, one or more of the seats 14, 16 may be behind the front end of the passenger compartment, e.g., at the rear end of the passenger compartment. The seats 14, 16 may be movable relative to the vehicle 12 floor to various positions, e.g., movable fore-and-aft and/or cross-vehicle. The seat may be of any suitable type, e.g., a bucket seat.

The seats 14, 16 include a seatback 28, a seat bottom 30, and a head restraint 32. The head restraint 32 may be supported by and extending upwardly from the seatback 28. The head restraint 32 may be stationary or movable relative to the seatback 28. The seatback 28 may be supported by the seat bottom 30 and may be stationary or movable relative to the seat bottom 30. The seatback 28 may extend from an upper end 34 to a lower end 36. The lower end 36 may be connected to the seat bottom 30. The upper end 34 of the seatback 28 may be spaced upwardly from the lower end 36 of the seatback 28, i.e., upwardly from the seat bottom 30. The seatback 28, the seat bottom 30, and the head restraint 32 may be adjustable in multiple degrees of freedom. Specifically, the seatback 28, the seat bottom 30, and the head restraint 32 may themselves be adjustable. In other words, adjustable components within the seatback 28, the seat bottom 30, and the head restraint 32 may be adjustable relative to each other.

The seatback 28 includes the seat frame (not numbered) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 28 is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seatback 28 and the seat bottom 30 of each of the seats 14, 16 define an occupant seating area 38 of the seats 14, 16. The occupant seating area 38 is the area occupied by an occupant when properly seated on the seat bottom 30 and the seatback 28. The occupant seating area 38 is in a seat-forward direction of the seatback 28 and above the seat bottom 30. In the example shown in the Figures, the occupant seating area 38 faces the front end of the passenger compartment when the seat is in the forward-facing position and the occupant seating area 38 faces the rear end of the passenger compartment when the seat is in the rearward-facing position.

Each of the first seat 14 and the second seat 16 define an occupant head area 40. The occupant head area 40 is vehicle-forward of the head restraint 32 of the seats 14, 16. The occupant head area 40 is the volume typically occupied by the head of an occupant properly seated in the seats 14, 16 of the vehicle 12.

With reference to FIGS. 1-5B, the vehicle 12 includes a middle console 42 between the two seats 14, 16 of the vehicle 12. Specifically, the middle console 42 may be supported by the vehicle floor between the seats 14, 16. The seats 14, 16 may each be vehicle-outboard of the middle console 42. The seats 14, 16 are spaced from each other by the middle console 42. The middle console 42 is adjacent each of the seats 14, 16.

The middle console 42 includes a fixed portion that is fixed relative to the passenger compartment. The middle console 42, specifically the fixed portion, may have sides that face laterally, i.e., face in the cross-vehicle direction C. The sides are adjacent the seats 14, 16, and the seats 14, 16 may be spaced from or may abut the sides. The fixed portion may have a forward side and a rearward side each extending in the cross-vehicle direction C from one side to the other side. Specifically, the forward side is spaced vehicle-forward from the rearward side. The forward side faces vehicle-forward and the rearward side faces vehicle-rearward. The middle console 42 may be formed of a rigid material, e.g., plastic.

The assembly 10 includes include an airbag assembly 44. The airbag assembly 44 includes the airbag 18, an inflator 46, and may include a housing (not shown). The airbag assembly 44, e.g., the airbag 18, is supported by first seat 14. Specifically, the airbag 18 is supported by the seatback 28 of the first seat 14. The airbag 18 may be supported by the seat frame of the seatback 28 of the first seat 14. The airbag 18 is supported by a vehicle-inboard side of the seat frame. The airbag 18 is inflatable from an uninflated position to the inflated position between the first seat 14 and the second seat 16. In other words, the airbag 18 is between the first seat 14 and the second seat 16 when the airbag 18 is in the inflated position. The first seat 14 and the second seat 16 are vehicle-outboard of the airbag 18. The airbag 18 may be inflatable to the inflated position above the middle console 42 and between the first seat 14 and the second seat 16.

The inflator 46 is fluidly connected to the airbag 18. The inflator 46 expands the airbag 18 with inflation medium, such as a gas, to inflate the airbag 18 from the uninflated position to the inflated position. The inflator 46 may be, for example, a pyrotechnic inflator that ignites a chemical reaction to generate the inflation medium, a stored gas inflator that releases (e.g., by a pyrotechnic valve) stored gas as the inflation medium, or a hybrid.

With continued reference to FIGS. 1-5B, the airbag 18 may include a plurality of chambers 20, 22. Specifically, the airbag 18 includes the main chamber 20 and the pair secondary chambers 22 supported by the main chamber 20. As discussed above, the airbag 18 is between the first seat 14 and the second seat 16 in the inflated position. Specifically, the main chamber 20 and the secondary chambers 22 are between the first seat 14 and the second seat 16 in the inflated position. The airbag 18 controls the kinematics of occupants seated in the seats 14, 16 in the event of an impact to the vehicle 12.

The main chamber 20 is in fluid communication with the secondary chambers 22. In other words, the inflation medium passes from the inflator 46, through the main chamber 20 and into the secondary chambers 22. As the main chamber 20 moves toward the inflated position, the inflation medium passes through the main chamber 20 to move the secondary chambers 22 toward the inflated position.

The main chamber 20 include a first panel 48 and a second panel 50 facing an opposite direction of the first panel 48. The first panel 48 and the second panel 50 each face vehicle-outboard and in opposite directions, i.e., the first panel 48 faces toward the first seat 14 and the second panel 50 faces toward the second seat 16. One of the secondary chambers 22 is supported by the first panel 48 of the main chamber 20 and the other of the secondary chamber is supported by the second panel 50 of the main chamber 20. Specifically, one of the secondary chambers 22 is supported by the first panel 48 adjacent the first seat 14 and the other of the secondary chambers 22 is supported by the second panel 50 adjacent the second seat 16.

Each of the secondary chambers 22 is supported by main chamber 20 at a proximal end 52. Specifically, the secondary chambers 22 are connected to the main chamber 20 at the proximal end 52. The secondary chambers 22 may be connected to the main chamber 20 in any suitable way, e.g., sewn, welded, etc. Each of the secondary chambers 22 extends upwardly from the main chamber 20 to a distal end 54. The distal end 54 is spaced upwardly from the proximal end 52 and the main chamber 20 in the inflated position.

In the inflated position, the secondary chambers 22 are adjacent the occupant head areas 40 defined by the seats 14, 16. Specifically, the secondary chambers 22 are sized and shaped to be positioned adjacent the occupant head area 40 of the first seat 14 and the occupant head area 40 of the second seat 16, i.e., the area occupied by the head of the occupants in the seats 14, 16. The secondary chambers 22 control the kinematics of a head of an occupant seated in the seat of the vehicle 12, i.e., an occupant occupying the occupant head area 40 defined by the seats 14, 16 in the passenger compartment.

Figure 4A:
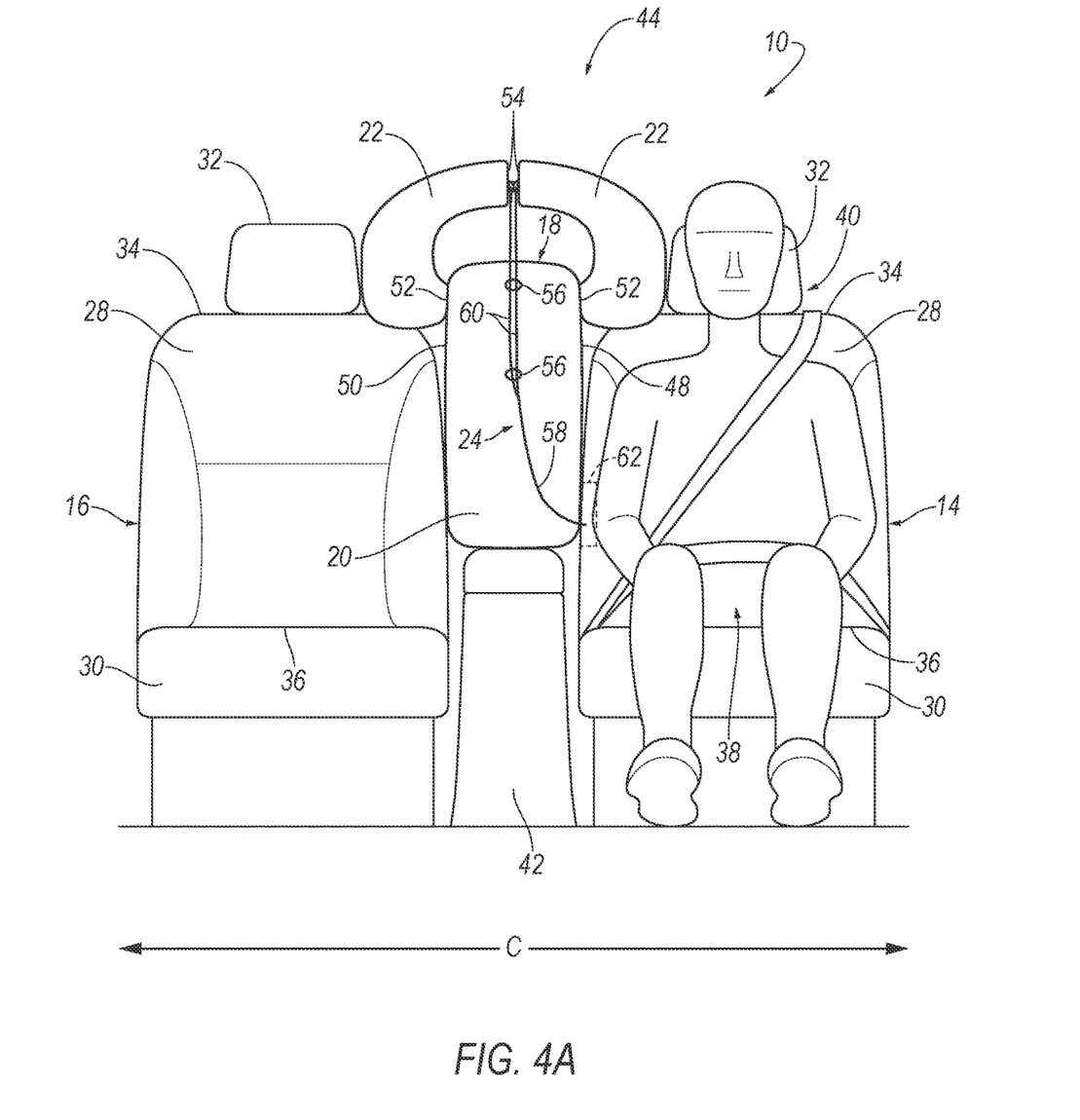
FIG. 4A is an example of the airbag having a tether extending along an exterior of the airbag to secondary chambers in an undeployed position.
Figure 4B:
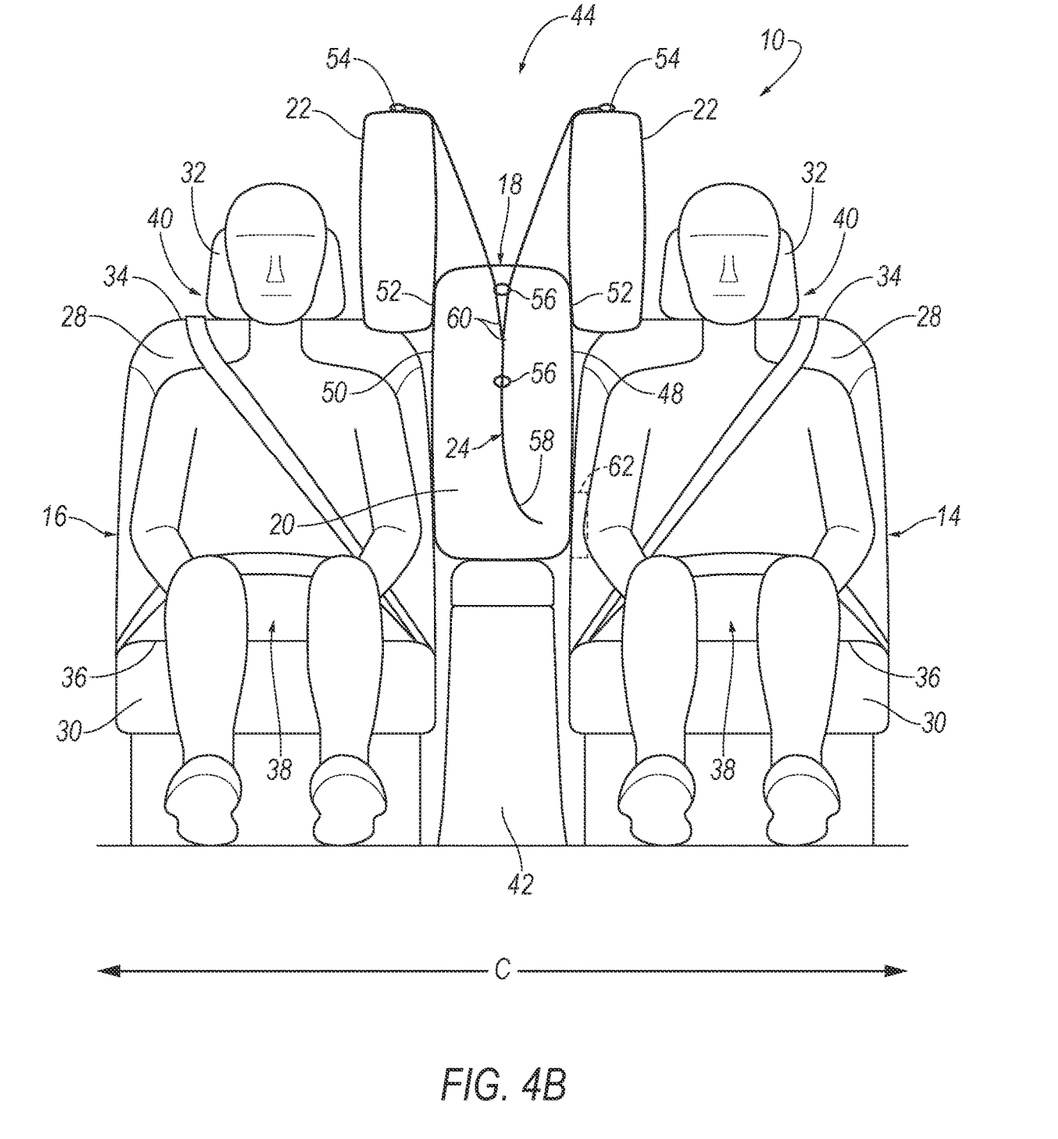
FIG. 4B is the example shown in FIG. 3A of the airbag having the tether extending along the exterior of the airbag to secondary chambers in a deployed position.
Figure 5A:
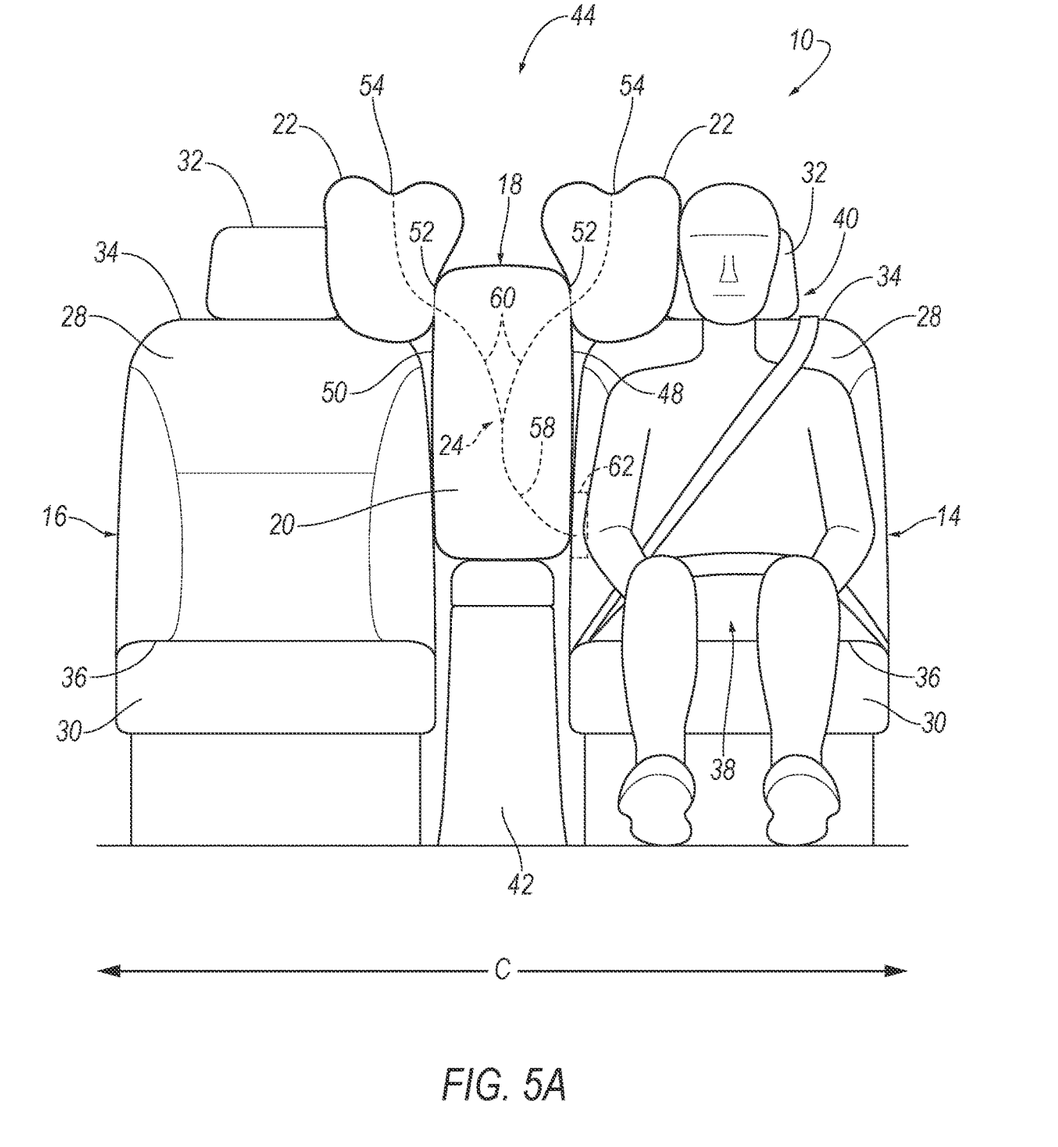
FIG. 5A is an example of the airbag having a tether extending along an interior of the airbag to secondary chambers in an undeployed position.
Figure 5B:
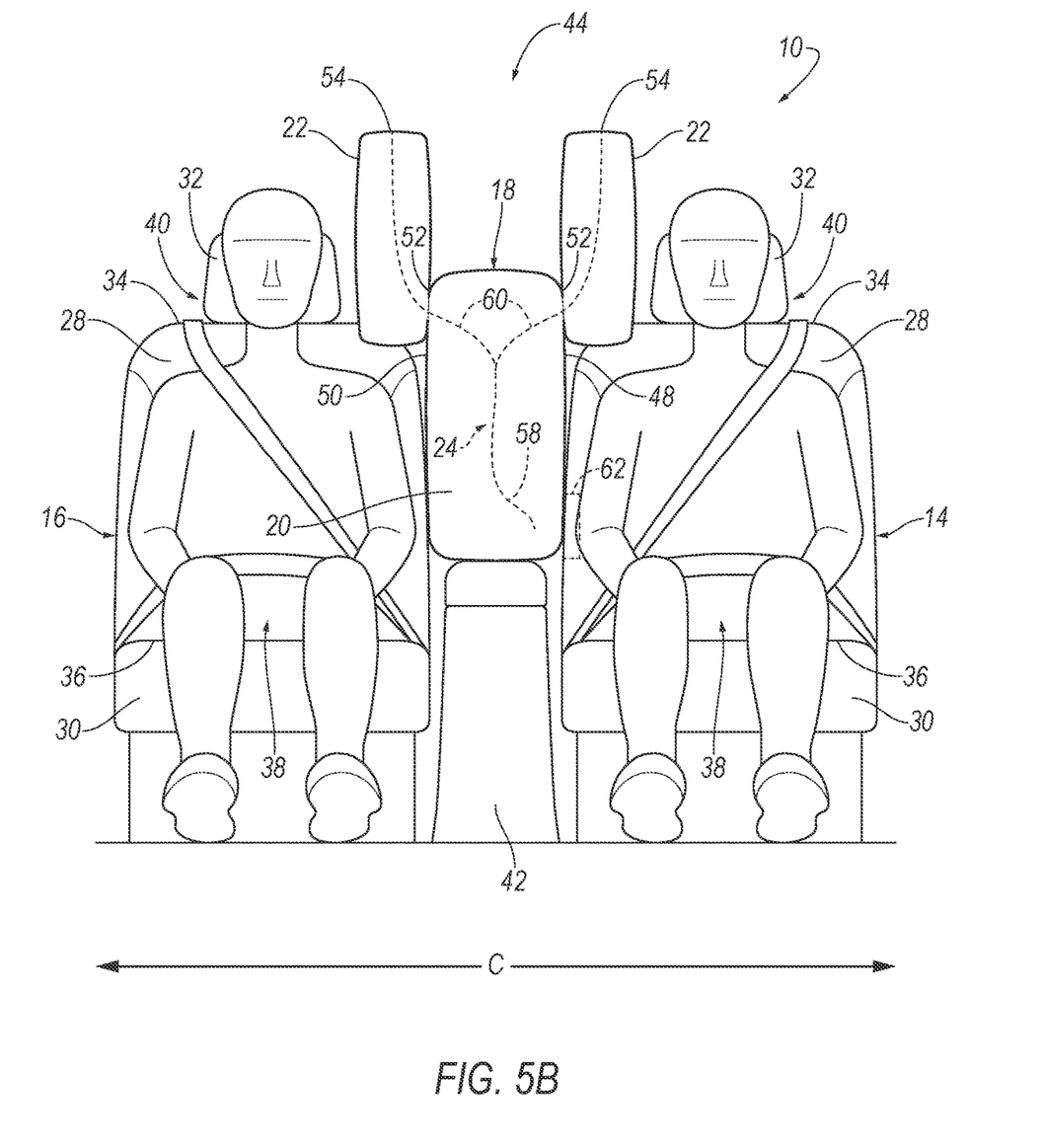
FIG. 5B is the example shown in FIG. 4A of the airbag having the tether extending along the interior of the airbag to secondary chambers in a deployed position.

The secondary chambers 22 move between an undeployed position and a deployed position. With reference to FIGS. 4A and 5A, in the event of an impact, the secondary chambers 22 may remain in the undeployed position if an occupant is seated in the first seat 14 and no occupant is seated in the second seat 16. With reference to FIGS. 4B and 5B, in the event of an impact, the secondary chambers 22 may move to the deployed position if an occupant is seated in both the first seat 14 and the second seat 16. Specifically, the secondary chambers 22 move in the cross-vehicle direction C relative to the main chamber 20. The secondary chambers 22 move in the cross-vehicle direction C toward the seats 14, 16, i.e., one secondary chamber moves toward the first seat 14 and the other secondary chamber moves toward the second seat 16. In other words, the secondary chambers 22 move vehicle-outboard from the undeployed position relative to the main chamber 20.

In the undeployed position, the distal ends 54 of the secondary chambers 22 are adjacent each other. Specifically, the distal ends 54 of the secondary chambers 22 may abut each other in the undeployed position. In the deployed position, the distal ends 54 of the secondary chambers 22 are spaced from each other. Each of the secondary chambers 22 define a distance between the distal end 54 and the proximal end 52. The distance between the distal end 54 and the proximal end 52 is greater in the deployed position than in the undeployed position. The distal ends 54 of the secondary chambers 22 move away from each other, i.e., the distal ends 54 move toward the first seat 14 and the second seat 16.

In the inflated position and when the secondary chambers 22 are in the deployed position, the main chamber 20 and the secondary chambers 22 are vertically elongated above the middle console 42 and between the first seat 14 and the second seat 16. As shown in FIGS. 2, 4B, and 5B, the main chamber 20 may be vertically elongated in a common direction to the secondary chambers 22 in the inflated position and the deployed position. The secondary chambers 22 are vertically elongated from the main chamber 20 in the inflated position. One of the secondary chambers 22 is vertically elongated from the first panel 48 of the main chamber 20 and the other of the secondary chambers 22 is vertically elongated from the second panel 50 of the main chamber 20. The secondary chambers 22 are vertically elongated from the proximal end 52 supported by the main chamber 20 to the distal end 54 above the main chamber 20.

With reference to FIGS. 4A-5B, the assembly 10 includes the tether 24 between the main chamber 20 and the secondary chambers 22. Specifically, the tether 24 extends from the main chamber 20 to the distal ends 54 of the secondary chamber. In the example shown in FIGS. 34A and 4B, the tether 24 extends exterior to the main chamber 20 and the secondary chambers 22 in the undeployed position. In such an example, the tether 24 may extend along the exterior of the main chamber 20 to the distal ends 54 of the secondary chambers 22. The airbag 18 may include guide loops 56 along the main chamber 20. The tether 24 may extend through the guide loops 56 to guide the tether 24 toward the distal ends 54. In another example, as shown in the example shown in FIGS. 5A and 5B, the tether 24 extends interior to the main chamber 20 and the secondary chambers 22 in the undeployed position. In such an example, the tether 24 may extend from the main chamber 20 to the distal ends 54 of the secondary chambers 22 along the interior of the airbag 18.

As shown in FIGS. 4A and 5A, the tether 24 is continuous between the main chamber 20 and each of the secondary chambers 22. in the undeployed position. The tether 24 may include a main segment 58 at the main chamber 20 and two segments 60 extending from the main segment 58 to the secondary chambers 22. Specifically, the two segments 60 extend from the main segment 58 to the distal ends 54 of the secondary chambers 22.

With reference to FIGS. 4B and 5B, the tether 24 is releasably connected to the secondary chambers 22. The secondary chambers 22 are maintained by the tether 24 in the undeployed position relative to the main chamber 20 and the secondary chambers 22 are releasable by the tether 24 to the deployed position in the cross-vehicle direction C relative to the main chamber 20. The secondary chambers 22 are in the deployed position when the tether 24 is released and the secondary chambers 22 are in the undeployed position when the tether 24 is maintained.

The assembly 10 includes a tether release 62. Specifically, the airbag assembly 44 may include the tether release 62. The tether 24 is releasable by the tether release 62. The tether release 62 may activate to release the tether 24 when occupants are seated in both the first seat 14 and the second seat 16. The secondary chambers 22 move to the deployed position when the tether release 62 releases the tether 24. When an occupant is seated in the first seat 14 and no occupant is seated in the second seat 16, the tether release 62 does not activate and does not release the tether 24 and the tether 24 is maintained.

The tether release 62 is supported by the seatback 28 of the first seat 14. Specifically, the tether release 62 may be supported by seat frame of the seatback 28. In some examples, the tether release 62 may be in the housing of the airbag assembly 44.

As an example, the tether release 62 may be a cutter that cuts the tether 24. As another example, the tether release 62 may be a clamp that releases the tether 24. The tether release 62 may be any suitable type of tether release 62 to release the tether 24 and move the secondary chambers 22 to the deployed position. The tether release 62 may be pyrotechnically actuated, i.e., the tether release 62 may include a pyrotechnic device that cuts the tether 24, releases the end of the tether 24, etc.

The airbag 18, e.g., the main chamber 20, the secondary chambers 22, and the tether 24, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The computer 26 controls the operation of the airbag assembly 44. Specifically, the computer 26 may be a restraints control module. Use of "in response to," "based on," and "upon determining" herein, including with reference to the computer 26 and methods performed by the computer 26, indicates a causal relationship, not merely a temporal relationship.

Figure 6:
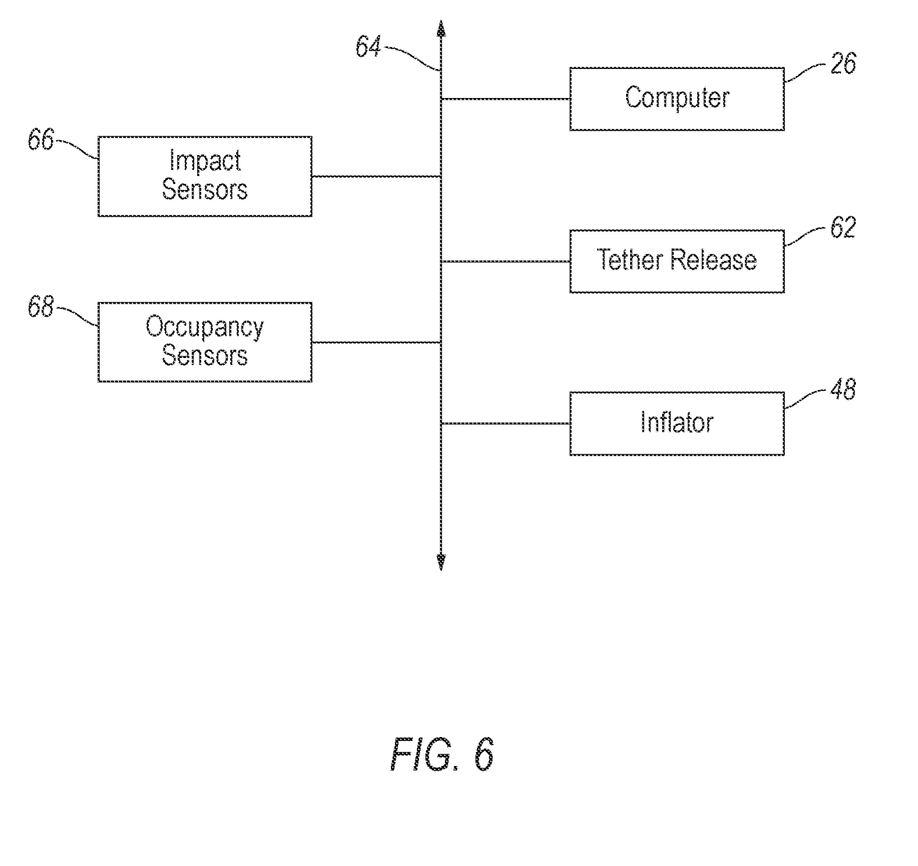
FIG. 6 is a block diagram of a vehicle communication network of the vehicle.

The computer 26 includes a processor and a memory. The memory includes one or more forms of computer readable media, and stores instructions executable by the computer for performing various operations, including as disclosed herein. For example, the computer 26 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 26 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 26. The memory can be of any type, e.g., hard disk drives, solid state drives, servers, or any volatile or non-volatile media. The memory can store the collected data sent from the sensors. The memory can be a separate device from the computer, and the computer 26 can retrieve information stored by the memory via a network in the vehicle 12, e.g., over a CAN bus, a wireless network, etc. Alternatively or additionally, the memory can be part of the computer, e.g., as a memory of the computer 26. The computer 26 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components. With reference to FIG. 6, the computer 26 is generally arranged for communications on a vehicle communication network 64 that can include a bus in the vehicle 12 such as a controller area network CAN or the like, and/or other wired and/or wireless mechanisms. Alternatively or additionally, in cases where the computer 26 actually comprises a plurality of devices, the vehicle communication network 64 may be used for communications between devices represented as the computer 26 in this disclosure. Further, as mentioned below, various controllers and/or sensors may provide data to the computer 26 via the vehicle communication network 64.

The vehicle 12 may include at least one impact sensor 66 for sensing impact of the vehicle 12, and the computer 26 may be in communication with the impact sensors 66. The impact sensor 66 is configured to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 66 may be located at numerous points in or on the vehicle 12.

The assembly 10 may include occupancy sensors 68 to identify whether an occupant is seated in the seats 14, 16. The computer 26 may be in communication with the occupancy sensors 68. The occupancy sensors 68 may be coupled to the seats 14, 16 to identify when an occupant is seated in the seats 14, 16. As an example, the occupancy sensors 68 may indicate to the computer 26 that the seat 14, 16 is occupied. For example, the occupancy sensor 68 may communicate to the computer 26, e.g., by sending a signal to the computer 26, that the seat 14, 16 is occupied and in the absence of such communication the computer 26 may classify the seat 14, 16 as unoccupied. As another example, the occupancy sensor 68 may be configured to communicate to the computer 26 that the seat 14, 16 is occupied when the seat 14, 16 is occupied and to communicate to the computer 26 that the seat 14, 16 is unoccupied when the seat 14, 16 is unoccupied, e.g., by sending a signal to the computer 26 when the seat 14, 16 is occupied and unoccupied indicating occupancy or lack thereof. The occupancy sensor 68 may be, for example, a weight sensor, image detection, a buckled seatbelt, etc. The vehicle 12 may include any suitable number of occupancy sensors 68. For example, the vehicle 12 may include a number of occupancy sensors 68 equal to the number of seats 14, 16 in the vehicle 12. Specifically, in the examples shown in the Figures, the first seat 14 and the second seat 16 may each include an occupancy sensor 68.

Figure 7:
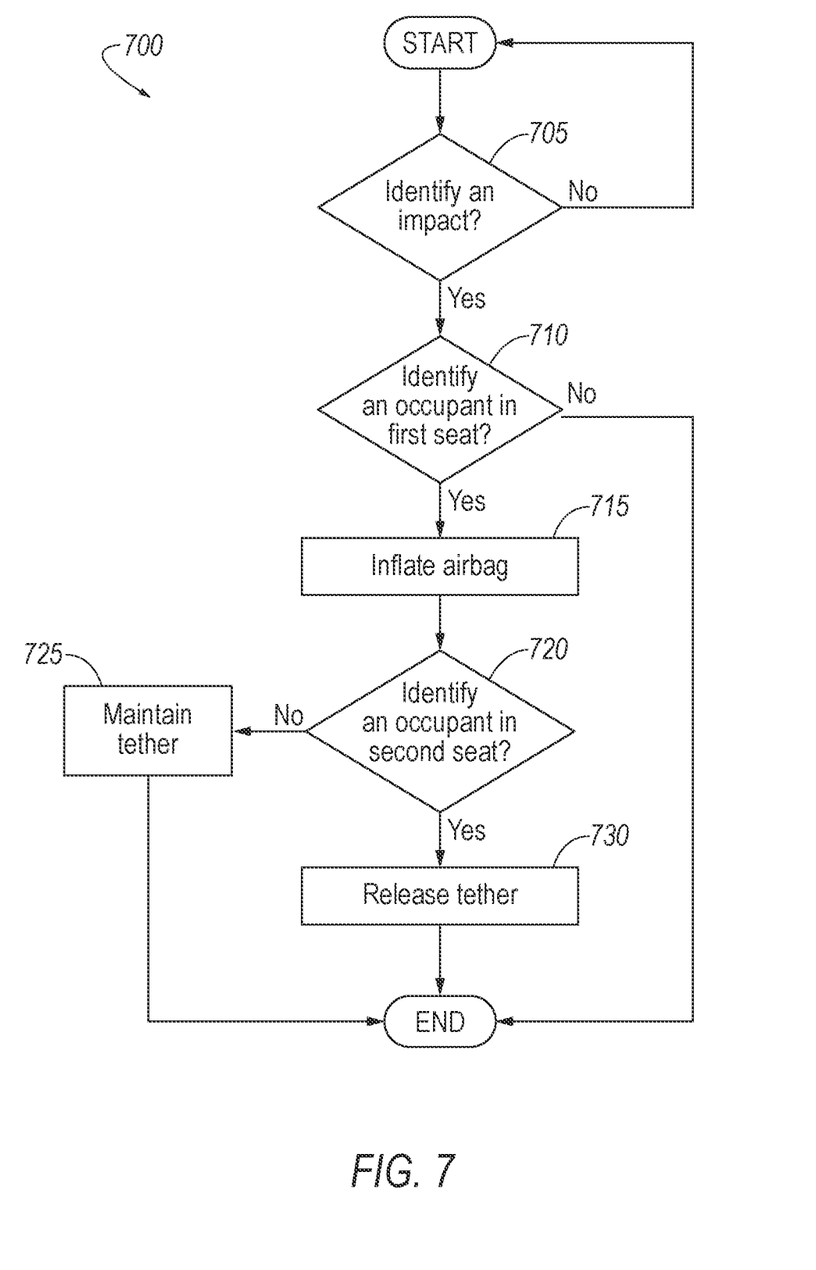
FIG. 7 is a flowchart of a method for releasing the tether to move the secondary chambers to the deployed position.

With reference to FIG. 7, the computer 26 stores instructions to control components of the vehicle 12 according to method 700. Specifically, the computer 26 may instruct the tether release 62 to activate and release the tether 24 to allow the secondary chambers 22 to move from the undeployed position to the deployed position.

With reference to decision block 705, the method 700 includes identifying an impact to the vehicle 12. The impact sensors 66 may send a signal to the computer 26 indicating the impact to the vehicle 12. If an impact is identified, the method 700 moves to decision block 710. If no impact is identified, the method 700 returns to its start.

With reference to decision block 710, based on identifying the impact, the instructions include identifying an occupant is seated in the first seat 14. For example, the identification of an occupant seated in the first seat 14 may be based on a detection by the occupancy sensor 68, as described above. In such an example, the occupancy sensor 68 detects the occupant seated in the first seat 14, e.g., by weight detection, image detection, seatbelt buckle detection, etc. This detection is communicated to the computer 26, e.g., through the vehicle communication network 64. If an occupant is identified as seated in the first seat 14, the method 700 moves to block 715. If no occupant is identified as seated in the first seat 14, the method 700 ends.

With reference to block 715, the method 700 includes inflating the airbag 18 to the inflated position. The computer 26 may instruct the inflator 46 of the airbag assembly 44 to inflate the airbag 18 to the inflated position.

With reference to decision block 720, the method 700 includes identifying an occupant is seated in the second seat 16. For example, the identification of an occupant seated in the second seat 16 may be based on detection by the occupancy sensor 68, as described above. In such an example, the occupancy sensor 68 detects the occupant seated in the second seat 16, e.g., by weight detection, image detection, seatbelt buckle detection, etc. This detection is communicated to the computer 26, e.g., through the vehicle communication network 64. If an occupant is identified as seated in the second seat 16, the method 700 moves to block 730. If no occupant is identified as seated in the second seat 16, the method 700 moves to block 725.

With reference to block 725, based on identifying the occupant in the first seat 14 and the lack of identifying an occupant in the second seat 16, the method 700 includes maintaining the tether 24, i.e., not releasing the tether 24. In other words, the tether release 62 is not activated and the tether 24 is maintained. The computer 26 decides not to instruct the tether release 62 to activate and release the tether 24 in response to identification of occupancy of the first seat 14 and no occupancy of the second seat 16. When the tether 24 is maintained, i.e., not released, the secondary chambers 22 are remained in the undeployed position.

With reference to block 730, based on identifying the occupant in the first seat 14 and the occupant in the second seat 16, the method 700 includes releasing the tether 24. Based on identification of the occupant in the first seat 14 and the occupant in the second seat 16, the computer 26 instructs the tether release 62 to release the tether. In response to the instruction by the computer 26 to the tether release 62, the tether release 62 may, for example, cut the tether 24, unclamp the tether 24, etc., to allow the tether 24 to be released. In other words, the tether release 62 is activated and releases the tether 24. Based on the tether release 62 being activated and the tether 24 being release, the secondary chambers 22 move to the deployed position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a first seat and a second seat spaced from the first seat;
an airbag supported by the first seat in an uninflated position, the airbag being inflatable to an inflated position between the first seat and the second seat;
the airbag having a main chamber and two secondary chambers supported by the main chamber;
a tether releasably connected to the secondary chambers, the secondary chambers being maintained by the tether in an undeployed position relative to the main chamber and the secondary chambers being releasable by the tether to a deployed position in a cross-vehicle direction relative to the main chamber;
the main chamber is between the two secondary chambers in the cross-vehicle direction in the inflated position;
one of the secondary chambers is adjacent the first seat between the main chamber and the first seat in the inflated position and the other of the secondary chambers is adjacent the second seat between the main chamber and the second seat in the inflated position; and
a computer including a processor and a memory storing instructions executable by the processor to:
identify that an occupant is seated in the first seat;

identify that an occupant is seated in the second seat; and release the tether based on the identification of the occupants seated in the first seat and the second seat.

2. The assembly of claim 1, wherein the tether is between the main chamber and the secondary chambers.

3. The assembly of claim 1, wherein the secondary chambers extend from a proximal end to a distal end, the secondary chambers being supported by the main chamber at the proximal ends and the tether extending from the main chamber to the distal ends of the secondary chamber.

4. The assembly of claim 3, wherein the distal ends of the secondary chambers are adjacent each other in the undeployed position and the distal ends of the secondary chambers are spaced from each other in the deployed position.

5. The assembly of claim 3, wherein the distal ends are spaced from each other in the deployed position.

6. The assembly of claim 3, wherein each of the secondary chambers define a distance between the distal end and the proximal end, the distance being greater in the deployed position than in the undeployed position.

7. The assembly of claim 1, wherein the instructions include to not release the tether based on identification of the occupant in the first seat and the lack of identification of an occupant in the second seat.

8. The assembly of claim 1, wherein the main chamber is in fluid communication with the secondary chambers.

9. The assembly of claim 1, wherein the main chamber includes a first panel and a second panel facing an opposite direction of the first panel, one of the secondary chambers being supported by the first panel of the main chamber and the other of the secondary chamber being supported by the second panel of the main chamber.

10. The assembly of claim 1, wherein the secondary chambers are in the deployed position when the tether is released and the secondary chambers are in the undeployed position when the tether is maintained.

11. The assembly of claim 1, wherein the tether extends interior to the main chamber and the secondary chambers in the undeployed position.

12. The assembly of claim 1, wherein the tether extends exterior to the main chamber and the secondary chambers in the undeployed position.

13. The assembly of claim 1, wherein the tether is continuous between the main chamber and each of the secondary chambers in the undeployed position.

14. The assembly of claim 1, further comprising a tether release, the tether being releasable by the tether release.

15. The assembly of claim 14, wherein the instructions include to activate the tether release based on identification of the occupants seated in the first seat and the second seat.

16. The assembly of claim 1, wherein the first seat and the second seat each define an occupant head area, the secondary chambers being adjacent the occupant head areas of the first seat and the second seat.

17. The assembly of claim 1, wherein the secondary chambers are vertically elongated from the main chamber in the inflated position.

18. The assembly of claim 17, wherein the main chamber is vertically elongated in a common direction to the secondary chambers in the inflated position.

19. The assembly of claim 1, wherein the tether includes a main segment at the main chamber and two segments extending from the main segment to the secondary chambers, respectively.

20. An assembly comprising:
a first seat and a second seat spaced from the first seat;
an airbag supported by the first seat in an uninflated position, the airbag being inflatable to an inflated position between the first seat and the second seat;
the airbag having a main chamber and two secondary chambers supported by the main chamber;
a tether releasably connected to the secondary chambers, the secondary chambers being maintained by the tether in an undeployed position relative to the main chamber and the secondary chambers being releasable by the tether to a deployed position in a cross-vehicle direction relative to the main chamber;
the tether extending interior to the main chamber and the secondary chambers in the undeployed position; and
a computer including a processor and a memory storing instructions executable by the processor to:
identify that an occupant is seated in the first seat;
identify that an occupant is seated in the second seat; and
release the tether based on the identification of the occupants seated in the first seat and the second seat.

* * * * *